US012529974B2

(12) United States Patent
Nagai et al.

(10) Patent No.: US 12,529,974 B2
(45) Date of Patent: Jan. 20, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Ryo Nagai, Kanagawa (JP); Sakon Takahashi, Kanagawa (JP); Yasuaki Hashimoto, Kanagawa (JP); Moegi Iguchi, Kanagawa (JP); Yosuke Tsurumi, Kanagawa (JP); Ryo Otake, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 666 days.

(21) Appl. No.: 17/950,115

(22) Filed: Sep. 22, 2022

(65) Prior Publication Data

US 2023/0097500 A1 Mar. 30, 2023

(30) Foreign Application Priority Data

Sep. 24, 2021 (JP) ................................ 2021-156172

(51) Int. Cl.
*G03G 9/097* (2006.01)
*G03G 9/08* (2006.01)

(52) U.S. Cl.
CPC ....... *G03G 9/09708* (2013.01); *G03G 9/0819* (2013.01); *G03G 9/0827* (2013.01); *G03G 9/09725* (2013.01)

(58) Field of Classification Search
CPC ............. G03G 9/09708; G03G 9/0827; G03G 9/09725
See application file for complete search history.

(56) References Cited

U.S. PATENT DOCUMENTS 5,176,979 A 1/1993 Eguchi et al.
10,527,962 B2 1/2020 Yamagishi et al.

FOREIGN PATENT DOCUMENTS

JP H04101162 4/1992
JP 2018194775 12/2018

(Continued)

OTHER PUBLICATIONS

Junya, Machine Translation of JP 2018-194775A, Dec. 6, 2018 (Year: 2018).*

(Continued)

*Primary Examiner* — Peter L Vajda
*Assistant Examiner* — Jenna Kuipers
(74) *Attorney, Agent, or Firm* — JCIPRNET

(57) ABSTRACT

An electrostatic charge image developing toner contains toner particles, silica particles that are added to an exterior of the toner particles, and titanic acid compound particles that are added to the exterior of the toner particles and have an average circularity of 0.890 or more and 0.950 or less, in which the silica particles include particles having a primary particle size of 80 nm or less, the particles having a primary particle size of 80 nm or less have at least one peak in a range of 20 nm or more and less than 80 nm in a number-based primary particle size distribution curve (hereinafter, silica particles having such a peak will be called "specific silica particles"), the titanic acid compound particles have at least one peak in a range of 20 nm or more and less than 80 nm in a number-based primary particle size distribution curve, a difference between an average circularity of the specific silica particles and the average circularity of the titanic acid compound particles is 0.05 or less, and a difference between a toner coverage of the specific silica particles and a toner coverage of the titanic acid compound particles is 20% points or less.

15 Claims, 3 Drawing Sheets

(56) References Cited

FOREIGN PATENT DOCUMENTS

| | | |
|---|---|---|
| JP | 2018194775 A | * 12/2018 |
| JP | 2019028235 | 2/2019 |

OTHER PUBLICATIONS

"Office Action of Japan Counterpart Application", issued on Apr. 22, 2025, with English translation thereof, pp. 1-6.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-156172 filed Sep. 24, 2021.

BACKGROUND

(i) Technical Field

The present invention relates to an electrostatic charge image developing toner, an electrostatic charge image developer, a toner cartridge, a process cartridge, an image forming apparatus, and an image forming method.

(ii) Related Art

JP2019-28235A discloses an electrostatic charge image developing toner containing toner particles that have an average circularity of 0.91 or more and 0.98 or less, silica particles that are added to the exterior of the toner particles, and strontium titanate particles that are added to the exterior of the toner particles and have an average primary particle size of 10 nm or more and 100 nm or less, in which an average circularity of primary particles of the strontium titanate particles is 0.82 or more and 0.94 or less, and a circularity of cumulative 84% of the primary particles of the strontium titanate particles is more than 0.92.

JP1992-101162A discloses a positively charged electrophotographic toner obtained by adding silica particles to toner particles, the silica particles having undergone a surface treatment with a quaternary ammonium salt compound that is substantially insoluble or poorly soluble in water.

SUMMARY

At a low temperature and a low humidity, the toner using silica particles and titanic acid compound particles experiences deterioration of charging characteristics, which sometimes leads to the contamination of the inside of a device or the occurrence of fog in a non-image area. Aspects of non-limiting embodiments of the present disclosure relate to an electrostatic charge image developing toner, an electrostatic charge image developer, a toner cartridge, a process cartridge, an image forming apparatus, and an image forming method that can maintain stable charging characteristics even in a case where silica particles and titanic acid compound particles are used as external additives.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrostatic charge image developing toner containing toner particles, silica particles that are added to an exterior of the toner particles, and titanic acid compound particles that are added to the exterior of the toner particles and have an average circularity of 0.890 or more and 0.950 or less, in which the silica particles include particles having a primary particle size of 80 nm or less, the particles having a primary particle size of 80 nm or less have at least one peak in a range of 20 nm or more and less than 80 nm in a number-based primary particle size distribution curve (hereinafter, silica particles having such a peak will be called "specific silica particles"), the titanic acid compound particles have at least one peak in a range of 20 nm or more and less than 80 nm in a number-based primary particle size distribution curve, a difference between an average circularity of the specific silica particles and the average circularity of the titanic acid compound particles is 0.05 or less, and a difference between a toner coverage of the specific silica particles and a toner coverage of the titanic acid compound particles is 20% points or less.

BRIEF DESCRIPTION OF THE DRAWINGS

Exemplary embodiment(s) of the present invention will be described in detail based on the following figures, wherein.

DETAILED DESCRIPTION

Figure 1:
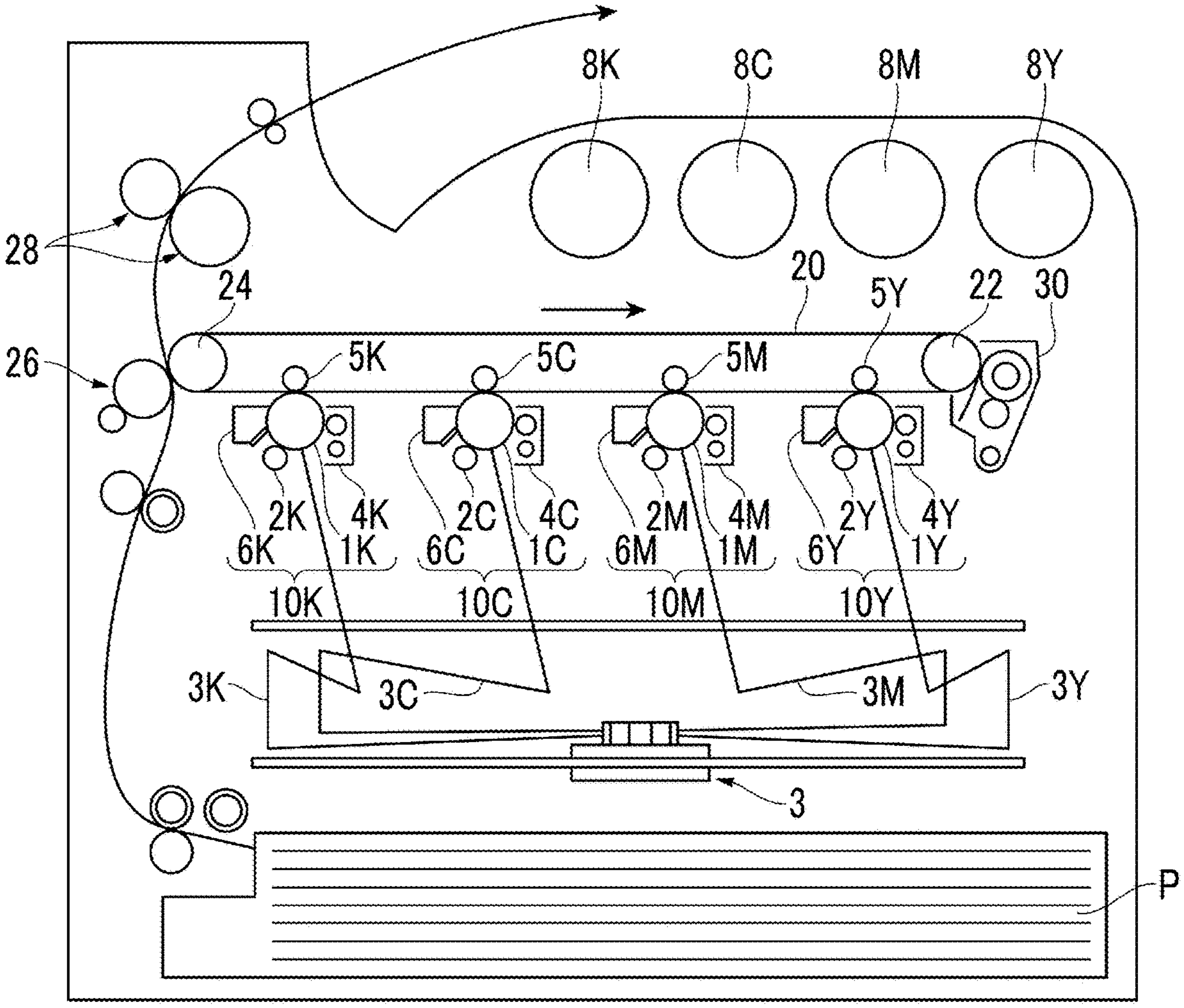
FIG. 1 is a view schematically showing the configuration of an example of an image forming apparatus according to the present exemplary embodiment.

Hereinafter, exemplary embodiments of the invention will be described. The following descriptions, examples, and the like merely illustrate the exemplary embodiments, and do not restrict the scope of the invention.

In the present disclosure, unless otherwise specified, the description of "00 or more and 00 or less" or "00 to 00" that represent a numerical range means a numerical range including the described upper limit and lower limit. Furthermore, in the present disclosure, in a case where the amount of each component in a composition is mentioned, and there are two or more kinds of substances corresponding to each component present in the composition, unless otherwise specified, the amount of each component means the total amount of two or more kinds of the substances present in the composition.

In the present disclosure, sometimes "electrostatic charge image developing toner" will be simply described as "toner", and "electrostatic charge image developer" will be simply described as "developer".

Electrostatic Charge Image Developing Toner

The toner according to the present exemplary embodiment contains toner particles, silica particles that are added to an exterior of the toner particles, and titanic acid compound particles that are added to the exterior of the toner particles and have an average circularity of 0.890 or more and 0.950 or less, in which the silica particles include particles having a primary particle size of 80 nm or less, the particles having a primary particle size of 80 nm or less have at least one peak in a range of 20 nm or more and less than 80 nm in a number-based primary particle size distribution curve (hereinafter, silica particles having such a peak will be called "specific silica particles"), the titanic acid compound particles have at least one peak in a range of 20 nm or more and less than 80 nm in a number-based primary particle size distribution curve, a difference between an average circularity of the specific silica particles and the average circularity of the titanic acid compound particles is 0.05 or less, and a difference between a toner coverage of the specific silica particles and a toner coverage of the titanic acid compound particles is 20% points or less.

The particles that have at least one peak in a range of 20 nm or more and less than 80 nm in a number-based primary particle size distribution curve as described above are called "specific silica particles" in the present invention.

The toner according to the present exemplary embodiment can maintain stable charging characteristics. The following is presumed as the mechanism.

To improve the fluidity of a toner, for example, an external additive (such as silica particles) having a particle size of about 20 nm to 80 nm is often used. The charging level of such silica particles is raised at a low humidity, which sometimes reduces density of the obtained image. As a solution to the problem of low image density, it is known that titanic acid compound particles, such as strontium titanate, are additionally used to reduce the charging level (such as JP2019-28235A).

In a case where silica particles and titanic acid compound particles are used in combination as external additives of a toner, and the toner is used to intermittently print out low-density images one by one for a long period of time in a low-temperature and low-humidity environment, sometimes the inside of the device is contaminated with the toner or fog occurs in the images. The intermittent printing additionally requires the time of no-load operation of the developing machine during setup. Therefore, in the intermittent printing, the toner is in conditions where the toner is under extremely higher stress, compared to continuous printing. Under such conditions, mutual charging occurs between the external additives, the silica particles and the titanic acid compound particles, on the toner surface, which widens the charging level of the toner and causes contamination or fog described above.

In the present exemplary embodiment, the silica particles and the titanic acid compound particles are made satisfy the following conditions of (a) peak position in particle size distribution, (b) average circularity, and (c) toner coverage, such that the toner can maintain stable charging characteristics without contaminating the inside of the device or causing fog in the images. Presumably, causing the silica particles and the titanic acid compound particles to have peaks at similar positions in the particle size distribution, to have similar shapes represented by the average circularity, and to have similar coverages may suppress the mutual charging between the external additives, the silica particles and the titanic acid compound particles, on the toner surface.

(a) Peak position in particle size distribution: both the silica particles and the titanic acid compound particles have at least one peak in a range of 20 nm or more and less than 80 nm in a number-based primary particle size distribution curve.

(b) Average circularity: the titanic acid compound particles have a roundish shape (details will be described later) having an average circularity of 0.890 or more and 0.950 or less, and a difference between an average circularity of the specific silica particles and the average circularity of the titanic acid compound particles is 0.05 or less.

(c) Toner coverage: a difference between a toner coverage of the specific silica particles and a toner coverage of the titanic acid compound particles is 20% points or less.

Hereinafter, the configuration of the toner according to the present exemplary embodiment will be specifically described.

Toner Particles

The toner particles contain, for example, a binder resin and, as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, polyester resin is suitable. Examples of the polyester resin include a polycondensate of a polyvalent carboxylic acid and a polyhydric alcohol.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less. The number-average molecular weight (Mn) of the polyester resin is, for example, preferably 2,000 or more and 100,000 or less. The molecular weight distribution Mw/Mn of the polyester resin is, for example, preferably 1.5 or more and 100 or less, and more preferably 2 or more and 60 or less.

The weight-average molecular weight and the number-average molecular weight of the polyester resin are measured by gel permeation chromatography (GPC). By GPC, the molecular weight is measured using GPC-HCL-8120GPC manufactured by Tosoh Corporation as a measurement device, TSKgel•Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, the monomer with poor compatibility may be condensed in advance with an acid or an alcohol that is to be polycondensed with the monomer, and then polycondensed with the major component.

The content of the binder resin with respect to the total mass of the toner particles is, for example, preferably 40% by mass or more and 95% by mass or less, more preferably 50% by mass or more and 90% by mass or less, and even more preferably 60% by mass or more and 85% by mass or less.

Colorant

Examples of colorants include pigments such as carbon black, chrome yellow, Hansa yellow, benzidine yellow, indanthrene yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total mass of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral•petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total mass of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Characteristics of Toner Particles

The toner particles may be toner particles that have a single-layer structure or toner particles having a so-called core/shell structure that is configured with a core portion (core particle) and a coating layer (shell layer) covering the core portion. The toner particles having a core/shell structure may be, for example, configured with a core portion that contains a binder resin and, as necessary, a colorant, a release agent, and the like and a coating layer that contains a binder resin.

The volume-average particle size (D50v) of the toner particles is, for example, preferably 2 μm or more and 10 μm or less, and more preferably 4 μm or more and 8 μm or less.

The volume-average particle size of the toner particles is measured using COULTER MULTISIZER II (manufactured by Beckman Coulter Inc.) and using ISOTON-II (manufactured by Beckman Coulter Inc.) as an electrolytic solution. For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less. The electrolytic solution in which the sample is suspended is subjected to a dispersion treatment for 1 minute with an ultrasonic disperser, and the particle size of particles having a particle size in a range of 2 μm or more and 60 μm or less is measured using COULTER MULTISIZER II with an aperture having an aperture size of 100 μm. The number of particles to be sampled is 50,000. In a volume-based particle size distribution of the measured particle sizes, the particle size below which the cumulative percentage of particles smaller than this size reaches 50% is determined as a volume-average particle size D50v.

In the present exemplary embodiment, from the viewpoint of making the toner well cleaned from an image holder, the average circularity of the toner particles is, for example, preferably 0.91 or more and 0.98 or less, more preferably 0.94 or more and 0.98 or less, and even more preferably 0.95 or more and 0.97 or less.

In the present exemplary embodiment, the circularity of the toner particles is calculated by (perimeter of circle having the same area as projected image of particle)÷(perimeter of projected image of particle). In a circularity distribution, the circularity below which the cumulative percentage of particles having circularity lower than this circularity reaches 50% is defined as the average circularity of the toner particles. The average circularity of the toner particles is determined by analyzing at least 3,000 toner particles with a flow-type particle image analyzer.

For example, in a case where the toner particles are manufactured by an aggregation and coalescence method, the average circularity of the toner particles can be controlled by adjusting the stirring rate of a dispersion and the temperature or retention time of a dispersion in a coalescence step.

Silica Particles

The silica particles used as an external additive of the toner in the present exemplary embodiment include particles having a primary particle size of 80 nm or less.

In the present exemplary embodiment, the silica particles as an external additive of the toner may have a monodisperse or polydisperse particle size distribution or may be polydisperse silica particles obtained by mixing together monodisperse silica particles.

In the present exemplary embodiment, "specific silica particles" have at least one peak in a range of 20 nm or more and less than 80 nm in a number-based primary particle size distribution curve, a difference between the average circularity of the specific silica particles and the average circularity of the titanic acid compound particles is 0.05 or less, and a difference between the toner coverage of the specific silica particles and the toner coverage of the titanic acid compound particles is 20% points or less.

For example, the number of peaks that the specific silica particles have in a range of 20 nm or more and less than 80 nm in the number-based primary particle size distribution curve is preferably 1. The specific silica particles may have a plurality of peaks. In a case where the specific silica particles have a plurality of peaks, a peak configured with the largest number of particles is defined as "specific silica particles" of the present exemplary embodiment.

From the viewpoint of improving fluidity of the toner, the specific silica particles have at least one peak in a range of 20 nm or more and less than 80 nm in the number-based primary particle size distribution curve. The specific silica particles have at least one peak, for example, preferably in a range of 30 nm or more and less than 80 nm, and more preferably in a range of 40 nm or more and less than 80 nm.

For example, in order to maintain stable charging characteristics of the toner, it is preferable that the specific silica particles and the titanic acid compound particles have similar shapes and similar toner coverages.

From the viewpoint described above, a difference between the average circularity of the specific silica particles and the average circularity of the titanic acid compound particles is 0.05 or less. For example, the difference in the average circularity is preferably 0.03 or less, and particularly preferably 0.01 or less. The difference between the toner coverage of the specific silica particles and the toner coverage of the titanic acid compound particles is 20% points or less. For example, the difference in the coverage is preferably 15% points, particularly preferably 10% points or less, and even more preferably 5% points or less.

In a case where the difference in the average circularity is larger than the above value, or in a case where the difference in the coverage is larger than the above value, mutual charging tends to occur between the specific silica particles and the titanic acid compound particles.

For example, in order to maintain stable charging characteristics of the toner, it is preferable that the specific silica particles and the titanic acid compound particles have similar particle sizes and similar peak shapes.

From the viewpoint described above, a difference between the particle size of the specific silica particles having the maximum peak in a range of 20 nm or more and less than 80 nm and the particle size of the titanic acid compound particles having the maximum peak in a range of 20 nm or more and less than 80 nm is, for example, preferably 20 nm or less, more preferably 15 nm or less, and particularly preferably 10 nm or less. Furthermore, a difference between a half width of the peak in a range of 20 nm or more and less than 80 nm in the number-based primary particle size distribution curve of the specific silica particles and a half width of the peak in a range of 20 nm or more and less than 80 nm in the number-based primary particle size distribution curve of the titanic acid compound particles is, for example, preferably 20 nm or less, and more preferably 10 nm or less.

In a case where the difference in the particle size is larger than the above value, or in a case where the difference in the half width is larger than the above value, mutual charging tends to occur between the specific silica particles and the titanic acid compound particles.

For example, it is preferable that the particle size having the maximum peak in a range of 20 nm or more and less than 80 nm be larger for the specific silica particles. This is because, for example, the larger the particle size, the higher the contribution to the charging of the toner, and in order to maintain the charging level of the negatively charged toner, it is preferable to increase the size of silica which is very readily negatively charged.

Characteristics of Specific Silica Particles

Degree of Hydrophobicity

A degree of hydrophobicity of the specific silica particles according to the present exemplary embodiment is, for example, preferably 10% or more and 60% or less. From the viewpoint of narrowing the charge distribution, the degree of hydrophobicity of the specific silica particles is, for example, more preferably 10% or more and 50% or less, and even more preferably 20% or more and 50% or less.

In a case where the degree of hydrophobicity of the silica particles is 10% or less, the silica particles are covered with a small amount of the structure due to the reaction caused by the silane coupling agent, and the content of the nitrogen element-containing compound tends to be reduced. As a result, the charge distribution easily widens.

On the other hand, in a case where the degree of hydrophobicity of the silica particles is higher than 60%, the density of the structure increases due to the reaction caused by the silane coupling agent, the number of pores tends to decrease, and the content of the nitrogen element-containing compound tends to be reduced. Therefore, the charge distribution easily widens.

The hydrophobic treatment is performed, for example, by immersing the silica particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these hydrophobic agents may be used alone, or two or more kinds of these hydrophobic agents may be used in combination. The amount of the hydrophobic agent is, for example, 1 part by mass or more and 10 parts by mass or less with respect to 100 parts by mass of the silica particles.

The degree of hydrophobicity of the silica particles is measured as follows.

As a sample, 0.2% by mass of silica particles are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Number-Based Primary Particle Size Distribution Curve and Average Primary Particle Size The average primary particle size of the specific silica particles according to the present exemplary embodiment is, for example, preferably 10 nm or more and 200 nm or less, more preferably 10 nm or more and 80 nm or less, and even more preferably 10 nm or more and 60 nm or less.

In a case where the average primary particle size of the specific silica particles is in the above range, the specific silica particles have a large specific surface area and are likely to be excessively charged. However, the silica particles according to the present exemplary embodiment can narrow the charge distribution even though the average primary particle size thereof is in the above range.

The number-based primary particle size distribution curve and average primary particle size of the specific silica particles are measured as follows.

The toner particles with exterior to which the silica particles are added are observed with a scanning electron microscope (SEM) at 40,000× magnification, the image of the silica particles on the observed toner particles is analyzed with image processing/analyzing software WinRoof (manufactured by MITANI Corporation), and equivalent circular diameters of at least 300 particles are calculated. Then, for the number of individual particles, a distribution curve is drawn from the number of small-sized particles, thereby obtaining a number-based primary particle size distribution curve. The silica particles of the present exemplary embodiment have at least one peak in a range of 20 nm or more and 80 nm or less.

In addition, for the number of individual particles, a cumulative distribution is drawn from the number of small-sized particles, and a particle size below which the cumulative percentage of particles smaller than this size reaches 50% is determined as an average primary particle size.

The number-based primary particle size distribution curve and average primary particle size of the titanic acid compound particles, which will be described later, are also measured by the same method.

Circularity

The average circularity of the specific silica particles according to the present exemplary embodiment is, for example, preferably 0.85 or more and 1.00 or less, more preferably 0.88 or more and 0.96 or less, and even more preferably 0.90 or more and 0.95 or less.

In a case where the average circularity of specific silica particles is in the above range, the silica particles have a large specific surface area and are likely to be excessively charged. However, the silica particles according to the present exemplary embodiment can narrow the charge distribution even though the average circularity thereof is in the above range.

The average circularity of silica particles is measured as follows.

The toner with exterior to which the silica particles are added is observed with a scanning electron microscope (SEM) at 40,000× magnification, the image of the silica particles on the observed toner particles is analyzed with image processing/analyzing software WinRoof (manufactured by MITANI Corporation), the circularity of 300 or more particles are calculated, and an arithmetic mean thereof is determined to calculate the average circularity.

The circularity is calculated by the following equation. The measurement method will be specifically described in Examples that will be described later.

$$\text{Circularity}=(\text{perimeter of circle having the same area as area of particle})\div(\text{perimeter of particle image})=4\pi\times(\text{area of particle})\div(\text{perimeter of particle image})^2$$

The average circularity of the titanic acid compound particles that will be described later is also measured by the same method.

Coverage

The coverage of the toner particles by the specific silica particles is, for example, preferably 5% or more and 40% or less, and more preferably 8% or more and 35% or less. The coverage is proportional to the amount of silica particles added. In a case where the coverage is too low, the fluidity of the toner tends to deteriorate. In a case where the coverage is too high, the problem of low image density tends to occur at a low humidity.

The coverage can be adjusted mostly by the amount of external additives, such as silica particles, and the toner added. The amount of the specific silica particles added (amount of the specific silica particles added to the exterior of the toner particles) with respect to 100 parts by mass of the toner particles is, for example, preferably 0.1 parts by mass or more and 10 parts by mass or less, more preferably 0.5 parts by mass or more and 7.0 parts by mass or less, and even more preferably 1.0 part by mass or more and 5.0 parts by mass or less.

The coverage of the toner particles by the silica particles is measured as follows.

The toner with exterior to which the silica particles are added is observed with a scanning electron microscope (SEM) at 40,000× magnification, the observed toner image is processed to be converted into a binary image of the external additive particles and toner base particles, a ratio between the area of the silica particles and other areas in a certain region is determined using image processing/analyzing software WinRoof (manufactured by MITANI Corporation), and the arithmetic mean of the ratios in 300 or more toner particles is calculated and adopted as the toner coverage by silica.

In reality, the toner coverage is analyzed for toner particles with exterior to which both the silica particles and the titanic acid compound particles are added. Under low-acceleration SEM conditions or by an energy dispersive X-ray analyzer (EDX device) or the like, the image of each external additive, such as silica particles and titanic acid compound particles, and the toner base particles are differentiated, and the area of the silica particles or titanic acid compound particles and other areas are determined to obtaining the coverage. The measurement method will be specifically described in Examples that will be described later.

The toner particle coverage by the titanic acid compound particles is also measured by the same method.

Abundance Ratio of Primary Particles

It is considered that mutual charging may occur between the specific silica particles and the titanic acid compound particles in a case where these particles are unevenly distributed on the toner. Therefore, presumably, for example, it is preferable that the specific silica particles and the titanic acid compound particles be in a dispersed state on the toner. Therefore, for example, the proportion of the external additives (total of the specific silica particles and the titanic acid compound particles) present as primary particles is preferably 10% or more, and more preferably 15% or more.

The abundance ratio of the primary particles is measured by the following method. By a scanning electron microscope (SEM), the toner with exterior to which external additives including the silica particles and the titanic acid compound are added is observed at 40,000× magnification. In a specific region on the obtained SEM image, the number of external additives (X) present as primary particles and the number of external additive particles (Y) present in an aggregated state are counted, and the abundance ratio of the primary particles is calculated by the following equation. The measurement method will be specifically described in Examples that will be described later.

$$\text{Abundance ratio of primary particles (\%)} = X \div (X+Y) \times 100$$

Manufacturing Method of Specific Silica Particles

For example, from the viewpoint of controlling the primary particle size and from the viewpoint of obtaining silica particles having a monodisperse particle size distribution, the specific silica particles are preferably silica particles manufactured by a wet manufacturing method.

As the wet manufacturing method of the specific silica particles, for example, a sol-gel method using tetraalkoxysilane as a material is preferable. The sol-gel method for manufacturing the silica particles is known. The sol-gel method includes, for example, steps of adding aqueous ammonia dropwise to a mixed solution obtained by mixing together tetraalkoxysilane, water, and an alcohol to prepare a silica sol suspension, centrifuging the silica sol suspension to separate wet silica gel, and drying the wet silica gel to obtain silica particles. Examples of the tetraalkoxysilane include tetramethoxysilane, tetraethoxysilane, tetrapropoxysilane, tetrabutoxysilane, and the like.

Titanic Acid Compound Particles

As described above, the titanic acid compound particles of the present exemplary embodiment have at least one peak in a range of 20 nm or more and less than 80 nm in a number-based primary particle size distribution curve, a difference between the average circularity of the specific silica particles and the average circularity of the titanic acid compound particles is 0.05 or less, and a difference between the toner coverage of the specific silica particles and the toner coverage of the titanic acid compound particles is 20% points or less.

For example, the number of peaks that the titanic acid compound particles have in a range of 20 nm or more and less than 80 nm in the number-based primary particle size distribution curve is preferably 1. The titanic acid compound particles may have a plurality of peaks. In a case where the titanic acid compound particles have a plurality of peaks, a peak configured with the largest number of particles is defined as the titanic acid compound particles of the present exemplary embodiment.

From the viewpoint of improving fluidity of the toner, the titanic acid compound particles have at least one peak in a range of 20 nm or more and less than 80 nm in the number-based primary particle size distribution curve. The titanic acid compound particles have at least one peak, for example, preferably in a range of 20 nm or more and less than 60 nm, and more preferably in a range of 30 nm or more and less than 60 nm.

From the viewpoint of excellently maintaining transfer properties, for example, the titanic acid compound particles are preferably in a roundish shape rather than being in the shape of a cube or rectangle.

The titanic acid compound particles have a perovskite crystal structure, and usually have a cubic or rectangular particle shape. Presumably, in cubic or rectangular titanic acid compound particles, that is, in titanic acid compound particles having corners, charges may be concentrated on the corners, and strong electrostatic repulsive force may locally act between the corners and the silica particles, which is likely to lead to the uneven distribution of the silica particles. In order to maintain the transfer efficiency in a low-temperature and low-humidity environment for a longer period of time, for example, the titanic acid compound particles are preferably in a shape with few corners, that is, in a roundish shape.

From the viewpoint of maintaining the transfer properties of the toner by particles and from the viewpoint of obtaining a value of 0.05 or less as the difference in the average circularity between the titanic acid compound particles and the specific silica particles such that the titanic acid compound particles and the specific silica particles have similar shapes, for example, the average circularity of primary particles of the titanic acid compound particles is 0.890 or more and 0.950 or less, preferably 0.890 or more and 0.940 or less, more preferably 0.895 or more and 0.935 or less, and even more preferably 0.885 or more and 0.930 or less.

In the present exemplary embodiment, the circularity of primary particles of the titanic acid compound particles is calculated by 4π×(area of primary particle image)÷(perimeter of primary particle image)$^2$. The average circularity of primary particles is a circularity below which the cumulative percentage of particles having a circularity lower than this circularity reaches 50% in a circularity distribution. The circularity of the titanic acid compound particles is determined by capturing an electron micrograph of the toner with exterior to which the titanic acid compound particles are added, and performing image analysis on at least 300 titanic acid compound particles on the toner particles. The measurement method will be specifically described in Examples that will be described later.

From the viewpoint of improving fluidity of the toner, for example, the titanic acid compound particles preferably have an average primary particle size of 10 nm or more and 100 nm or less. In a case where the average primary particle size of the titanic acid compound particles is too small, the titanic acid compound particles are likely to be buried in the toner particles, which tends to make it difficult to obtain the action of improving fluidity of the toner. In a case where the average primary particle size of the titanic acid compound particles is too large, the titanic acid compound particles are likely to roll on the surface of the toner particles and be unevenly distributed in recesses of the toner particles having different shapes, which tends to make it difficult to obtain the action of improving fluidity of the toner.

From the viewpoint described above, the average primary particle size of the titanic acid compound particles is, for example, preferably 10 nm or more and 100 nm or less, more preferably 20 nm or more and 80 nm or less, even more preferably 20 nm or more and 60 nm or less, and still more preferably 30 nm or more and 60 nm or less.

In the present exemplary embodiment, the primary particle size of the titanic acid compound particles is the diameter of a circle having the same area as the area of the primary particle image (so-called equivalent circular diameter), and the average primary particle size of the titanic acid compound particles is a particle size below which the cumulative percentage of particles smaller than this size reaches 50% in a number-based primary particle size distribution. The primary particle size of the titanic acid compound particles is determined by capturing an electron micrograph of the toner with exterior to which the titanic acid compound particles are added, and performing image analysis on at least 300 titanic acid compound particles on the toner particles. The measurement method will be specifically described in Examples that will be described later.

The circularity, peak position, and average primary particle size of the titanic acid compound particles can be controlled, for example, by various conditions adopted in manufacturing the titanic acid compound particles by a wet manufacturing method.

The coverage of the toner particles by the titanic acid compound particles is, for example, preferably 5% or more and 40% or less, and more preferably 8% or more and 35% or less. The coverage is proportional to the amount of the titanic acid particles added. In a case where the coverage is too low, the fluidity of the toner tends to deteriorate. In a case where the coverage is too high, the problem of low image density tends to occur at a low humidity.

Preferred examples of the titanic acid compound particles include metal titanate particles. From the viewpoint of stable charging properties in various environments, for example, strontium titanate particles, magnesium titanate particles, and calcium titanate particles are preferable, and strontium titanate particles are more preferable.

The titanic acid compound particles are preferably doped, for example, with a metal element other than titanium and the metal configuring the titanic acid compound (hereinafter, the metal element will be also called dopant). In a case where the titanic acid compound particles contain the dopant, the crystallinity of the perovskite structure is reduced, and the titanic acid compound particles have a roundish shape.

The dopant of the titanic acid compound particles is not particularly limited as long as the dopant is a metal element other than titanium and the metal configuring the titanic acid compound. For example, a metal element is preferable which has an ionic radius that enables the metal element to enter the crystal structure configuring the titanic acid compound particles when ionized. From the viewpoint described above, the dopant of the titanic acid compound particles is, for example, preferably a metal element having an ionic radius of 40 μm or more and 200 μm or less when ionized, and more preferably a metal element having an ionic radius of 60 μm or more and 150 μm or less when ionized.

In a case where the titanic acid compound is strontium titanate, specifically, examples of the dopant of the titanic acid compound particles include lanthanoid, silica, aluminum, magnesium, calcium, barium, phosphorus, sulfur, calcium, vanadium, chromium, manganese, iron, cobalt, nickel, copper, gallium, yttrium, zinc, niobium, molybdenum, ruthenium, rhodium, palladium, silver, indium, tin, antimony, barium, tantalum, tungsten, rhenium, osmium, iridium, platinum, and bismuth. As lanthanoid, lanthanum and cerium are preferable. Among these, from the viewpoint of ease of doping and ease of control of the shape of the titanic acid compound particles, for example, lanthanum is preferable.

In a case where the titanic acid compound is strontium titanate, as the dopant of the titanic acid compound particles, from the viewpoint of preventing the titanic acid compound particles from being excessively negatively charged, for example, a metal element having an electronegativity of 2.0 or less is preferable, and a metal element having an electronegativity of 1.3 or less is more preferable. In the present exemplary embodiment, the electronegativity is the Allred-Rochow electronegativity. Examples of metal elements having an electronegativity of 2.0 or less include lanthanum (electronegativity 1.08), magnesium (1.23), aluminum (1.47), silica (1.74), calcium (1.04), vanadium (1.45), chromium (1.56), manganese (1.60), iron (1.64), cobalt (1.70), nickel (1.75), copper (1.75), zinc (1.66), gallium (1.82), yttrium (1.11), zirconium (1.22), niobium (1.23), silver (1.42), indium (1.49), tin (1.72), barium (0.97), tantalum (1.33), rhenium (1.46), cerium (1.06), and the like. Among these, for example, lanthanum is preferable.

From the viewpoint of allowing the titanic acid compound particles to have the perovskite crystal structure and a roundish shape, in the titanic acid compound particles, the amount of the dopant with respect to the metal element such as strontium is, for example, preferably in a range of 0.1 mol % or more and 20 mol % or less, more preferably in a range of 0.1 mol % or more and 15 mol % or less, and even more preferably in a range of 0.1 mol % or more and 10 mol % or less.

The water content of the titanic acid compound particles is, for example, preferably 1.5% by mass or more and 10% by mass or less. In a case where the water content is 1.5% by mass or more and 10% by mass or less (for example, more preferably 2% by mass or more and 5% by mass or less), the resistance of the titanic acid compound particles is controlled in an appropriate range, and the uneven distribution of the titanic acid compound particles resulting from the electrostatic repulsion between the titanic acid compound particles is excellently suppressed. The water content of the titanic acid compound particles can be controlled, for example, by manufacturing the titanic acid compound particles by a wet manufacturing method and adjusting the temperature and time of a drying treatment. In a case where a hydrophobic treatment is performed on the titanic acid compound particles, by adjusting the temperature and time of the drying treatment following the hydrophobic treatment, it is possible to control the water content of the titanic acid compound particles.

The water content of the titanic acid compound particles is measured as follows.

A measurement sample (20 mg) is left to stand for 17 hours in a chamber at a temperature of 22° C./a relative humidity of 55% such that the sample is humidified. Then, in a room at a temperature of 22° C./a relative humidity of 55%, by a thermobalance (TGA-50 manufactured by Shimadzu Corporation), the sample is heated from 30° C. to 250° C. at a temperature rise rate of 30° C./min in nitrogen gas atmosphere, and a loss on heating (loss of mass caused by heating) is measured.

Thereafter, based on the measured loss on heating, the water content is calculated by the following equation.

Water content (% by mass)=(loss on heating from 30° C. to 250° C.)÷(mass of humidified sample not yet being heated)×100

From the viewpoint of improving the action of the titanic acid compound particles, the titanic acid compound particles are preferably, for example, titanic acid compound particles with surface having undergone a hydrophobic treatment, and more preferably titanic acid compound particles with surface having undergone a hydrophobic treatment using a silicon-containing organic compound.

Manufacturing Method of Titanic Acid Compound Particles

The titanic acid compound particles may be simply titanic acid compound particles or particles obtained by performing a hydrophobic treatment on the surface of titanic acid compound particles. The manufacturing method of the titanic acid compound particles is not particularly limited. However, from the viewpoint of controlling the particle size and shape, the manufacturing method is preferably, for example, a wet manufacturing method.

Manufacturing of Titanic Acid Compound Particles

The wet manufacturing method of the titanic acid compound particles is, for example, a manufacturing method of causing a reaction in a state of adding an alkaline aqueous solution to a mixed solution of a titanium oxide source and a metal source such as strontium, and then performing an acid treatment. In this manufacturing method, the particle size of the titanic acid compound particles is controlled by a mixing ratio between the titanium oxide source and the metal source, the concentration of the titanium oxide source at the initial state of reaction, the temperature during the addition of the alkaline aqueous solution, the addition rate of the alkaline aqueous solution, and the like.

For example, as the titanium oxide source, a substance is preferable which is obtained by deflocculating a titanium compound hydrolysate by a mineral acid. Examples of the metal source include nitric acid, a chloride, and the like. In a case where the metal is strontium, examples of the strontium source include strontium nitrate and strontium chloride.

In a case where MO represents a metal, the mixing ratio of the metal source to the titanium oxide source that is expressed as $MO/TiO_2$ molar ratio is, for example, preferably 0.9 or more and 1.4 or less, and more preferably 1.05 or more and 1.20 or less. The concentration of the titanium oxide source, which is $TiO_2$, at the initial state of reaction is, for example, preferably 0.05 mol/L or more and 1.3 mol/L or less, and more preferably 0.5 mol/L or more and 1.0 mol/L or less.

From the viewpoint of allowing the titanic acid compound particles to have a roundish shape instead of a cubic or rectangular shape, for example, it is preferable to add a dopant source to the mixed solution of the titanium oxide source and the metal source. Examples of the dopant source include oxides of metals other than titanium and strontium. The metal oxide as a dopant source is added, for example, as a solution obtained by dissolving the metal oxide in nitric acid, hydrochloric acid, or sulfuric acid. The amount of the dopant source added with respect to 100 mol of the metal contained in the metal source, such as strontium, is, for example, preferably an amount that makes a metal content in the dopant source become 0.1 mol or more and 20 mol or less, and more preferably an amount that makes a metal content in the dopant source become 0.5 mol or more and 10 mol or less.

As the alkaline aqueous solution, for example, an aqueous sodium hydroxide solution is preferable. The higher the temperature of the reaction solution during the addition of the alkaline aqueous solution, the better the crystallinity of the obtained titanic acid compound particles. From the viewpoint of allowing the titanic acid compound particles to have the perovskite crystal structure and a roundish shape, the temperature of the reaction solution during the addition of the alkaline aqueous solution is, for example, preferably in a range of 60° C. or higher and 100° C. or lower. The lower the addition rate of the alkaline aqueous solution, the larger the particle size of the obtained titanic acid compound particles. The higher the addition rate of the alkaline aqueous solution, the smaller the particle size of the obtained titanic acid compound particles. The addition rate of the alkaline aqueous solution is, for example, 0.001 equivalents/h or more and 1.2 equivalents/h or less with respect to the prepared raw materials. A proper addition rate of the alkaline aqueous solution is 0.002 equivalents/h or more and 1.1 equivalents/h or less.

After the alkaline aqueous solution is added, for the purpose of removing the unreacted metal source, an acid treatment is performed. In the acid treatment, for example, by using hydrochloric acid, the pH of the reaction solution is adjusted to 2.5 to 7.0 and more preferably to 4.5 to 6.0. After the acid treatment, the reaction solution is subjected to solid-liquid separation, and the solids are subjected to a drying treatment, thereby obtaining titanic acid compound particles.

Surface Treatment

The surface treatment for the titanic acid compound particles is performed, for example, by preparing a treatment liquid by means of mixing a silicon-containing organic compound as a hydrophobic agent with a solvent, mixing the treatment liquid with the titanic acid compound particles under stirring, and continuing stirring. After the surface treatment, for the purpose of removing the solvent of the treatment liquid, a drying treatment is performed.

Examples of the silicon-containing organic compound used in the surface treatment for the titanic acid compound particles include an alkoxysilane compound, a silazane compound, a silicone oil, and the like.

Examples of the alkoxysilane compound used in the surface treatment for the titanic acid compound particles include tetramethoxysilane, tetraethoxysilane; methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane; dimethyldimethoxysilane, dimethyldiethoxysilane, methylvinyldimethoxysilane, methylvinyldiethoxysilane, diphenyldimethoxysilane, diphenyldiethoxysilane; trimethylmethoxysilane, and trimethylethoxysilane.

Examples of the silazane compound used in the surface treatment for the titanic acid compound particles include dimethyldisilazane, trimethyldisilazane, tetramethyldisilazane, pentamethyldisilazane, hexamethyldisilazane, and the like.

Examples of the silicone oil used in the surface treatment for the titanic acid compound particles include silicone oils such as dimethylpolysiloxane, diphenylpolysiloxane, and phenylmethylpolysiloxane; reactive silicone oils such as amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, and phenol-modified polysiloxane; and the like.

The solvent used for preparing the aforementioned treatment liquid is, for example, preferably an alcohol (for example, methanol, ethanol, propanol, or butanol) in a case where the silicon-containing organic compound is an alkoxysilane compound or a silazane compound, or preferably hydrocarbons (for example, benzene, toluene, normal hexane, and normal heptane) in a case where the silicon-containing organic compound is a silicone oil.

In the treatment liquid, the concentration of the silicon-containing organic compound is, for example, preferably 1% by mass or more and 50% by mass or less, more preferably 5% by mass or more and 40% by mass or less, and even more preferably 10% by mass or more and 30% by mass or less.

The amount of the silicon-containing organic compound used in the surface treatment with respect to 100 parts by mass of the titanic acid compound particles is, for example, preferably 1 part by mass or more and 50 parts by mass or less, more preferably 5 parts by mass or more and 40 parts by mass or less, and even more preferably 5 parts by mass or more and 30 parts by mass or less.

The amount of the titanic acid compound particles added to the exterior of the toner particles with respect to 100 parts by mass of the toner particles is, for example, preferably 0.2 parts by mass or more and 4 parts by mass or less, more preferably 0.4 parts by mass or more and 3 parts by mass or less, and even more preferably 0.6 parts by mass or more and 2 parts by mass or less.

The amount of the titanic acid compound particles added to the exterior of the toner particles with respect to 100 parts by mass of the silica particles is, for example, preferably 10 parts by mass or more and 100 parts by mass or less, more preferably 20 parts by mass or more and 90 parts by mass or less, and even more preferably 30 parts by mass or more and 80 parts by mass or less.

Other External Additives

As long as the effects of the present exemplary embodiment are obtained, the toner according to the present exemplary embodiment may contain other external additives in addition to the silica particles and the titanic acid compound particles. Examples of such other external additives include the following inorganic particles and resin particles.

Examples of such other external additives include inorganic particles. Examples of the inorganic particles include $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, $MgSO_4$, and the like.

For example, the surface of the inorganic particles as an external additive may have undergone a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobic agent is 1 part by mass or more and 10 parts by mass or less with respect to 100 parts by mass of the inorganic particles.

Examples of such other external additives also include resin particles (resin particles such as polystyrene, polymethyl methacrylate, and a melamine resin), a cleaning activator (for example, fluorine-based polymer particles), and the like.

The amount of such other external additives added to the exterior of the toner particles with respect to the toner particles is, for example, preferably 0.01% by mass or more and 5% by mass or less, and more preferably 0.01% by mass or more and 2.0% by mass or less.

Manufacturing Method of Toner

Next, the manufacturing method of the toner according to the present exemplary embodiment will be described.

The toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among the above methods, for example, the aggregation and coalescence method may be used for obtaining toner particles.

Specifically, for example, in a case where the toner particles are manufactured by the aggregation and coalescence method, the toner particles are manufactured through a step of preparing a resin particle dispersion in which resin particles to be a binder resin are dispersed (a resin particle dispersion-preparing step), a step of allowing the resin particles (plus other particles as necessary) to be aggregated in the resin particle dispersion (having been mixed with another particle dispersion as necessary) to form aggregated particles (aggregated particle forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. For example, it goes without saying that other additives different from the colorant and the release agent may also be used.

Resin Particle Dispersion-Preparing Step

For example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (0 phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle Forming Step

Next, the resin particle dispersion is mixed with the colorant particle dispersion and the release agent particle dispersion. Then, in the mixed dispersion, the resin particles, the colorant particles, and the release agent particles are hetero-aggregated so that aggregated particles are formed which have a diameter close to the diameter of the target toner particles and include the resin particles, the colorant particles, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles−30° C. and equal to or lower than the glass transition temperature of the resin particles−10° C.) such that the particles dispersed in the mixed dispersion are aggregated, thereby forming aggregated particles.

In the aggregated particle forming step, for example, in a state where the mixed dispersion is being stirred with a rotary shearing homogenizer, an aggregating agent may be added thereto at room temperature (for example, 25° C.), the pH of the mixed dispersion may be adjusted so that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) so that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed so as to cause the resin particles to be aggregated and adhere to the surface of the aggregated particles and to form second aggregated particles, and a step of heating a second aggregated particle dispersion in which the second aggregated particles are dispersed so as to cause the second aggregated particles to coalesce and to form toner particles having a core/shell structure.

After the coalescence step ends, the toner particles formed in a solution are subjected to known washing step, solid-liquid separation step, and drying step, thereby obtaining dry toner particles. As the washing step, from the viewpoint of charging properties, displacement washing may be thoroughly performed using deionized water. As the solid-liquid separation step, from the viewpoint of productivity, suction filtration, pressure filtration, or the like may be performed. As the drying step, from the viewpoint of productivity, freeze-drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Ladige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment. The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like. Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like. Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is used which includes a developing unit that contains the electrostatic charge image developer according to the present exemplary embodiment.

An example of the image forming apparatus according to the present exemplary embodiment will be described below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that prints out images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are detachable from the image forming apparatus.

An intermediate transfer belt (an example of an intermediate transfer member) 20 passing through the units 10Y, 10M, 10C, and 10K extends above the units. The intermediate transfer belt 20 is looped around a driving roll 22 and a support roll 24 that are in contact with the inner surface of the intermediate transfer belt 20, and runs toward a fourth unit 10K from a first unit 10Y. Force is applied to the support roll 24 in a direction away from the driving roll 22 by a spring or the like (not shown in the drawing). Tension is applied to the intermediate transfer belt 20 looped over the two rolls. An intermediate transfer belt cleaning device 30 facing the driving roll 22 is provided on the side of the intermediate transfer belt 20 on the surface of the image holder.

Toners of yellow, magenta, cyan, and black, stored in toner cartridges 8Y, 8M, 8C, and 8K are supplied to developing devices (an example of developing units) 4Y, 4M, 4C, and 4K of units 10Y, 10M, 10C, and 10K, respectively.

The first to fourth units 10Y, 10M, 10C, and 10K have the same configuration and perform the same operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll 2Y (an example of a charging unit) that charges the surface of the photoreceptor 1Y at a predetermined potential, an exposure device 3 (an example of an electrostatic charge image forming unit) that exposes the charged surface to a laser beam 3Y based on color-separated image signals so as to form an electrostatic charge image, a developing device 4Y (an example of a developing unit) that develops the electrostatic charge image by supplying a charged toner to the electrostatic charge image, a primary transfer roll (an example of a primary transfer unit) 5Y that transfers the developed toner image onto the intermediate transfer belt 20, and a photoreceptor cleaning device 6Y (an example of an image holder cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to primary transfer rolls 5Y, 5M, 5C, and 5K of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3, the laser beam 3Y is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being stirred in the developing device 4Y, the yellow toner undergoes triboelectrification, carries charges of the same polarity (negative polarity) as the charges with which the surface of the photoreceptor 1Y is charged, and is held on a developer roll (an example of a developer holder). Then, as the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing). The residual toner on the photoreceptor 1Y is removed by a photoreceptor cleaning device 6Y and collected.

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

The recording paper P onto which the toner image is transferred is transported into a pressure contact portion (nip portion) of a pair of fixing rolls in the fixing device 28 (an example of a fixing unit), the toner image is fixed to the surface of the recording paper P, and a fixed image is formed. The recording paper P on which the color image has been fixed is transported to an output portion, and a series of color image forming operations is finished.

Examples of the recording paper P to which the toner image is to be transferred include plain paper used in electrophotographic copy machines, printers, and the like. Examples of the recording medium also include an OHP sheet and the like, in addition to the recording paper P. In order to further improve the smoothness of the image surface after fixing, for example, it is preferable that the surface of the recording paper P be also smooth. For instance, coated paper prepared by coating the surface of plain paper with a resin or the like, art paper for printing, and the like are used.

Process Cartridge and Toner Cartridge

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
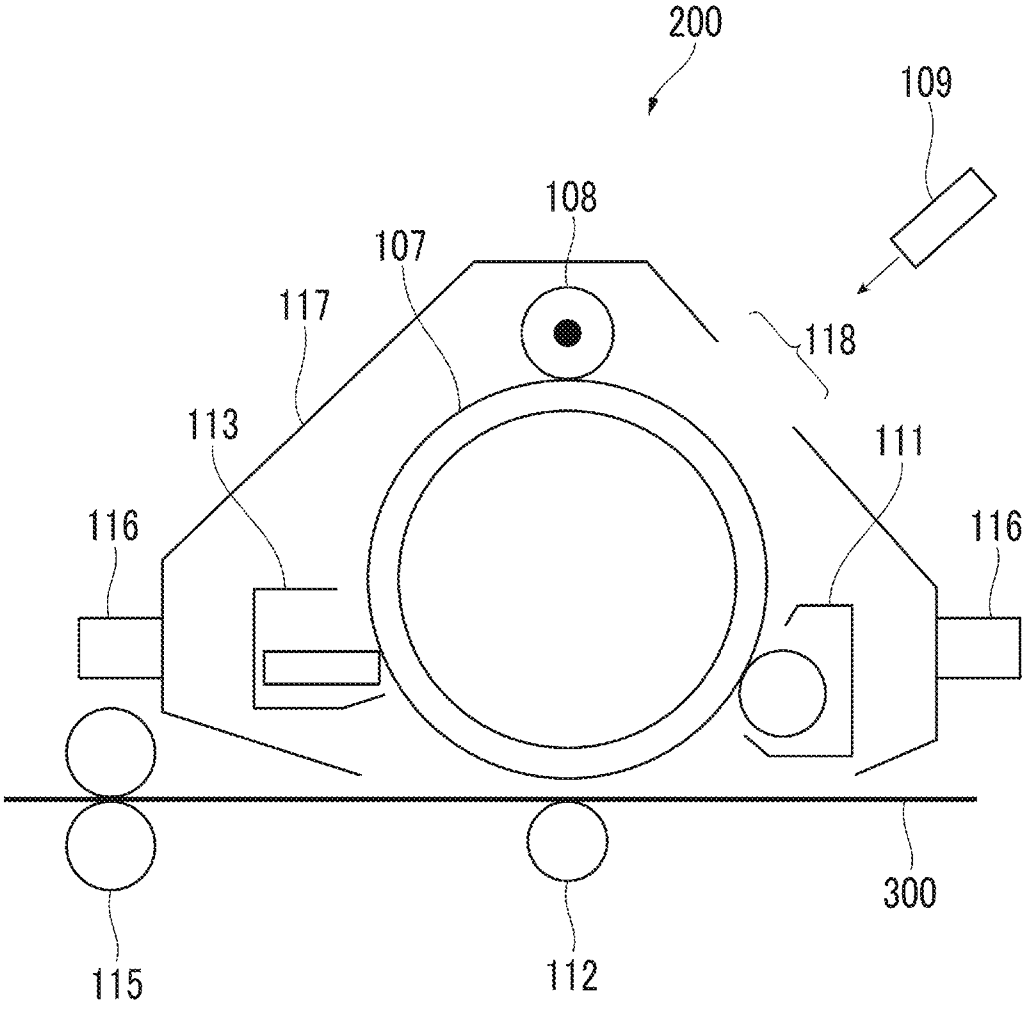
FIG. 2 is a view schematically showing the configuration of an example of a process cartridge detachable from the image forming apparatus according to the present exemplary embodiment.

FIG. 2 is a view schematically showing an example of the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective colors by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples. In the following description, unless otherwise specified, "parts" and "%" are based on mass.

Manufacturing of Toner Particles

Preparation of Resin Particle Dispersion

Terephthalic acid: 30 parts by mol

Fumaric acid: 70 parts by mol

Ethylene oxide adduct of bisphenol A: 5 parts by mol

Propylene oxide adduct of bisphenol A: 95 parts by mol

The above materials are put in a flask equipped with a stirrer, a nitrogen introduction tube, a temperature sensor, and a rectifying column, the temperature is raised to 220° C. for an hour, and titanium tetraethoxide is added thereto in an amount of 1 part with respect to 100 parts of the above materials. While the generated water is being distilled off, the temperature is raised to 230° C. for 30 minutes, a dehydrocondensation reaction is continued for 1 hour at 230° C., and then the reactant is cooled. In this way, a polyester resin having a weight-average molecular weight of 18,000 and a glass transition temperature of 60° C. is obtained.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes. Thereafter, the container is cleaned out by dry nitrogen purging, and in a state where the mixed solution is being stirred at a temperature kept at 40° C., 400 parts of deionized water is added dropwise thereto at a rate of 2 parts/min. After the dropwise addition ends, the temperature is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less. Deionized water is added to the resin particle dispersion, and the solid content thereof is adjusted to 20% by mass, thereby obtaining a resin particle dispersion.

Preparation of Colorant Particle Dispersion

C. I. Pigment Blue 15: 3 (Dainichiseika Color & Chemicals Mfg. Co., Ltd.): 70 parts Anionic surfactant (DKS Co. Ltd., NEOGEN RK): 5 parts Deionized water: 200 parts The above materials are mixed together and dispersed for 10 minutes by using a homogenizer (IKA, trade name ULTRA-TURRAX T50). Deionized water is added thereto such that the solid content in the dispersion is 20% by mass, thereby obtaining a colorant particle dispersion in which colorant particles having a volume-average particle size of 170 nm are dispersed.

Preparation of Release Agent Particle Dispersion

Paraffin wax (NIPPON SEIRO CO., LTD., HNP-9), 100 parts

Anionic surfactant (DKS Co. Ltd., NEOGEN RK): 1 part

Deionized water: 350 parts

The above materials are mixed together, heated to 130° C., and dispersed using a homogenizer (IKA, ULTRA-TURRAX T50). Then, by using Munton Gorlin high-pressure homogenizer (Gorlin), dispersion treatment is performed, thereby obtaining a release agent dispersion (solid content of 20% by mass) in which release agent particles are dispersed.

Preparation of Toner Particles

Resin particle dispersion: 403 parts

Colorant particle dispersion: 12 parts

Release agent particle dispersion: 50 parts

Anionic surfactant (TaycaPower): 2 parts

The above materials are put in a round flask made of stainless steel, 0.1 N nitric acid is added thereto to adjust the pH to 3.5, and then 30 parts of an aqueous nitric acid solution having a polyaluminum chloride concentration of 10% by mass is added thereto. Then, the obtained solution is dispersed at a liquid temperature of 30° C. by using a homogenizer (IKA, trade name ULTRA-TURRAX T50), then heated to 45° C. in an oil bath for heating, and kept as it is for 30 minutes. Subsequently, 100 parts of the resin particle dispersion is added thereto, the reaction solution is kept as it is for 1 hour, a 0.1N aqueous sodium hydroxide solution is added thereto such that the pH is adjusted to 8.5, and the reaction solution is then heated to 84° C. and kept as it is for 2.5 hours. Thereafter, the reaction solution is cooled to 20° C. at a rate of 20° C./min, filtered, thoroughly washed with deionized water, and dried, thereby obtaining toner particles. The volume-average particle size of the toner particles is 5.7 μm.

Manufacturing of Silica Particles

Preparation of Silica Particle Dispersion (1)

Methanol (320 parts) and 73 parts of 10% aqueous ammonia are added to a 1.5 L reaction vessel made of glass equipped with a stirrer, a dripping nozzle, and a thermometer, thereby obtaining an alkaline catalyst solution.

The temperature of the alkaline catalyst solution is adjusted to 30° C., and then 47 parts of tetramethoxysilane (TMOS) and 9 parts of 8.0% aqueous ammonia are simultaneously added dropwise to the alkaline catalyst solution for 11 minutes under stirring, thereby obtaining a hydrophilic silica particle dispersion. Thereafter, the obtained silica particle dispersion is concentrated to a concentration of solids of 40% by using a rotary filter R-fine (manufactured by KOTOBUKI KOGYOU. CO., LTD.). The concentrated dispersion is used as a silica particle dispersion (1).

Preparation of Silica Particle Dispersions (2) and (4)

Silica particle dispersions (2) and (4) are prepared in the same manner as the manner adopted for preparing the silica particle dispersion (1), except that in the step of preparing the silica particle dispersion (1), the amount of 10% aqueous ammonia in the alkaline catalyst solution, the amount of tetramethoxysilane added to the alkaline catalyst solution, the amount of 8% aqueous ammonia added dropwise, and the time of dropwise addition are changed to the conditions shown in Table 1.

TABLE 1

| | Used amount (parts) | | Amount added dropwise (parts) | | Time of drop-wise |
|---|---|---|---|---|---|
| | Methanol | 10% aqueous ammonia | TMOS | 8% aqueous ammonia | addition (min) |
| Silica particle dispersion (1) | 320 | 73 | 47 | 9 | 11 |
| Silica particle dispersion (2) | 320 | 69 | 55 | 13 | 14 |
| Silica particle dispersion (4) | 320 | 78 | 56 | 14 | 15 |

Hydrophobic Surface Treatments (1), (2), and (4)

The silica particle dispersions (1), (2), and (4) are centrifuged and dried at 120° C. for 2 hours, thereby obtaining silica. The silica (100 parts) and 500 parts of ethanol are put in an evaporator, and the mixture is stirred for 15 minutes at a temperature kept at 40° C. Subsequently, as a hydrophobic agent, dimethyldimethoxysilane in an amount of 10 parts with respect to 100 parts of the silica is added to the mixture, and the mixture is further stirred for 15 minutes. Then, the internal temperature of the system is raised to 90° C. to remove ethanol, and the surface-treated silica is taken out and dried in a vacuum at 120° C. for 30 minutes. The dried silica is pulverized, thereby obtaining silica particles (1), (2), and (4).

Hydrophobic Surface Treatment (3)

As a hydrophobic agent, 20 parts of hexamethyldisilazane (HMDS) is added to 250 parts of the silica particle dispersion (1) and allowed to react at 120° C. for 2 hours, followed by cooling. Then, the reaction solution is dried by spray drying, thereby obtaining hydrophobic silica particles (3) with surface having undergone a hydrophobic treatment.

Manufacturing of Strontium Titanate Particles

Strontium Titanate Particles (1)

Metatitanic acid which is a desulfurized and deflocculated titanium source is collected in an amount of 0.7 mol as $TiO_2$ and put in a reaction vessel. Then, 0.77 mol of an aqueous strontium chloride solution is added to the reaction vessel such that the molar ratio of $SrO/TiO_2$ is 1.1. Thereafter, a solution obtained by dissolving lanthanum oxide in nitric acid is added to the reaction vessel, in an amount that makes the amount of lanthanum becomes 2.5 mol with respect to 100 mol of strontium. The initial $TiO_2$ concentration in the mixed solution of the three materials is adjusted to 0.75 mol/L. Subsequently, the mixed solution is stirred and heated to 90° C., 153 mL of a 10N aqueous sodium hydroxide solution is added dropwise thereto for 4.2 hours in a state where the mixed solution is being stirred at a liquid temperature kept at 90° C., and the obtained reaction solution is continuously stirred for 1 hour at a liquid temperature kept at 90° C. The reaction solution is then cooled to 40° C., hydrochloric acid is added thereto until the pH reaches 5.5, and the reaction solution is stirred for 1 hour. Thereafter, decantation and redispersion in water are repeated to wash the precipitate. Hydrochloric acid is added to the slurry containing the washed precipitate such that the pH is adjusted to 6.5, solid-liquid separation is performed by filtration, and the solids are dried. i-Butyltrimethoxysilane in an ethanol solution is added to the dried solids, in an amount that makes the amount of the i-butyltrimethoxysilane becomes 20 parts with respect to 100 parts of the solids, followed by stirring for 1 hour. Solid-liquid separation is performed by filtration, and the solids are dried in the atmosphere at 130° C. for 7 hours, thereby obtaining strontium titanate particles (1).

Strontium Titanate Particles (2)

Strontium titanate particles (2) are prepared in the same manner as in the preparation of the strontium titanate particles (1), except that the time taken for adding 10N aqueous sodium hydroxide solution dropwise is changed to 5.5 hours.

Strontium Titanate Particles (3)

Strontium titanate particles (3) are prepared in the same manner as in the preparation of the strontium titanate particles (1), except that the time taken for adding 10N aqueous sodium hydroxide solution dropwise is changed to 6.5 hours.

Preparation of Carrier

- Ferrite particles (average particle size 35 μm): 100 parts
- Toluene: 14 parts
- Styrene-methyl methacrylate copolymer (copolymerization ratio 15/85):2 parts
- Carbon black: 0.2 parts The above materials excluding the ferrite particles are dispersed with a sand mill, thereby preparing a dispersion. The dispersion is put in a vacuum deaerating kneader together with the ferrite particles, and dried under reduced pressure while being stirred, thereby obtaining a carrier.

Preparation of Toner and Developer: Examples 1 to 7 and Comparative Examples 1 to 4

Silica particles and strontium titanate particles are added to 100 parts of the toner particles in accordance with the combinations and amounts shown in Table 2, and mixed together by using a Henschel mixer at a circumferential speed of stirring of 30 m/sec for 15 minutes. Then, the mixture is sieved using a vibration sieve having an opening size of 45 μm, thereby obtaining a toner containing external additives.

The toner containing external additives (10 parts) and 100 parts of the carrier are put in a V blender and stirred for 20 minutes. Then, the mixture is sieved using a sieve having an opening size of 212 μm, thereby obtaining a developer.

Analysis of Toner and External Additives

Shape Characteristics of Silica Particles and Strontium Titanate Particles (Average Primary Particle Size, Peak Position, and Average Circularity)

By using a scanning electron microscope (SEM) (manufactured by Hitachi High-Tech Corporation. S-4800) equipped with an energy dispersive X-ray analyzer (EDX device) (manufactured by HORIBA, Ltd., EMAX Evolution X-Max 80 $mm^2$), an image of the toner with exterior to which external additives including silica particles and strontium titanate particles are added is captured at 40,000× magnification. By EDX analysis, 300 or more primary particles of silica are identified from a single field of view based on the presence of Si, and 300 or more primary particles of strontium titanate are identified from a single field of view based on the presence of Ti. The SEM observation is performed at an acceleration voltage of 15 kV, an emission current of 20 μA, and WD of 15 mm, and the EDX analysis is performed under the same conditions for a detection time of 60 minutes.

By the analysis of identified silica particles and strontium titanate particles with the image processing/analysis software WinRoof (MITANI CORPORATION), the equivalent circular diameter, area, and perimeter of each of the primary particle images are determined, and circularity=4π×(area)÷(perimeter)$^2$ is calculated.

For the number of individual particles, a distribution curve is drawn from the number of particles with small equivalent circular diameter, thereby obtaining a number-based primary particle size distribution curve. The equivalent circular diameter below which the cumulative percentage of particles having smaller equivalent circular diameters reaches 50% is defined as an average primary particle size, and the position of the particle size having the maximum peak in a range of 20 nm or more and less than 80 nm in the distribution curve is determined. Furthermore, in the circularity distribution, the circularity below which the cumulative percentage of particles having lower circularity reaches 50% is defined as an average circularity.

In all the examples, both the silica particles and strontium titanate particles have monodisperse particle size distribution. The half width of the peak of each particle in a range of 20 nm or more and less than 80 nm is 15 nm or more and 35 nm or less, and a difference between the peak half width of the silica particles and the peak half width of the strontium titanate particles in each example is 20 nm or less.

Coverage of External Additive

By using a scanning electron microscope equipped with the aforementioned EDX device, an image of the toner with exterior to which external additives including silica particles and strontium titanate particles are added is captured at 40,000× magnification under low-acceleration SEM conditions. Each of the external additive particles and the toner base particles is subjected to a binarization processing. At this time, because the low-acceleration SEM conditions are adopted, the silica particles as an external additive can be visually differentiated as white and the strontium titanate particles as the external additive can be visually differentiated as gray. Therefore, the following coverage is determined for each particle.

Coverage of silica particles: The ratio of area of toner occupied by silica particles to total area of toner Coverage of strontium titanate particles: The ratio of area of toner occupied by strontium titanate particles to total area of toner (In this example, a differentiation can be made between the silica particles and the strontium titanate particles. In a case where it is difficult to make a differentiation, the particles are differentiated by sorting elements into Si and Ti by EDX).

In the present invention, as described above, the ratio determined by image analysis is used as the coverage. The coverage of an external additive can also be calculated by the following equation 1 from the particle size of the toner, the specific gravity of the toner, the particle size of the external additive, and the specific gravity of the external additive. Table 2 also shows the results calculated by Equation 1. However, a difference between the numerical value obtained by image analysis and the numerical value obtained by calculation is less than 1% point in all examples, which confirms that the analytical values obtained by the image analysis also have excellent reproducibility.

$$\text{Coverage (\%)} = \frac{\sqrt{3}}{2\pi} \times \frac{Dt \cdot \rho t}{Da \cdot \rho a} \times \frac{\text{Amount of external additive added}}{\text{Amount of toner added}} \times 100 \tag{1}$$

In Equation 1, Dt represents the average primary particle size of a toner, ρt represents the specific gravity of the toner, Da represents the average primary particle size of an external additive, and ρa represents the specific gravity of the external additive. The average primary particle size of toner base particles (before the addition of the external additive) determined by the method described above is 5.7 nm. For the specific gravity of each substance, the following numerical values obtained by actual measurement using a pycnometer are used.

Specific gravity of toner: 1.1

Specific gravity of silica particles: 1.2

Specific gravity of strontium titanate particles: 3.6

The true specific gravity of silica is 2.2, and the true specific gravity of strontium titanate is 5.1, which shows that the measured specific gravity is low for both the compounds. Presumably, because the external additives are manufactured by a wet method, the compounds may, for example, have internal voids and retain water on the inside, which may result in the low specific gravity. The calculation by Equation 1 requires the specific gravity of the external additive that varies with the manufacturing method or the like. Therefore, as the coverage of the external additive in the present invention, a coverage determined by the aforementioned image analysis is used.

Abundance Ratio of Primary Particles of External Additive

An image of the toner with exterior to which external additives including silica particles and strontium titanate particles are added is captured with the aforementioned scanning electron microscope at 40,000× magnification. On the obtained SEM image, a relatively smooth portion of the toner surface having a size of 1 μm×1 μm is selected, and the number of primary particles (X) and aggregated particles (Y) of the external additives is counted (the number is counted without differentiation between the silica particles and the strontium titanate particles), and the average of 20 fields of view is calculated by the following equation and adopted as the abundance ratio (%) of the primary particles.

$$\text{Abundance ratio of primary particles (\%)} = X \div (X+Y) \times 100$$

Table 2 shows the analysis results of toners and developers.

TABLE 2

| Example, Comparative Example | Type and amount (parts) of external additive: Silica | Type and amount (parts) of external additive: Strontium titanate | Circularity: Silica | Circularity: Strontium titanate | Circularity: Absolute value of difference in circularity | Peak position (nm): Silica | Peak position (nm): Strontium titanate | Peak position (nm): Absolute value of difference in particle size |
|---|---|---|---|---|---|---|---|---|
| Example 1 | (1), 0.8 | (1), 2.0 | 0.912 | 0.910 | 0.002 | 55 | 52 | 3 |
| Example 2 | (1), 0.4 | (1), 3.2 | 0.912 | 0.910 | 0.002 | 55 | 52 | 3 |

TABLE 2-continued

| | | | | | | | | |
|---|---|---|---|---|---|---|---|---|
| Example 3 | (1), 1.1 | (1), 1.2 | 0.912 | 0.910 | 0.002 | 55 | 52 | 3 |
| Example 4 | (2), 1.0 | (2), 2.4 | 0.939 | 0.892 | 0.047 | 77 | 59 | 18 |
| Example 5 | (2), 0.6 | (2), 3.4 | 0.939 | 0.892 | 0.047 | 77 | 59 | 18 |
| Example 6 | (2), 1.5 | (2), 1.5 | 0.939 | 0.892 | 0.047 | 77 | 59 | 18 |
| Example 7 | (3), 0.8 | (1), 2.0 | 0.912 | 0.910 | 0.002 | 55 | 52 | 3 |
| Comparative Example 1 | (1), 0.3 | (1), 3.5 | 0.912 | 0.910 | 0.002 | 55 | 52 | 3 |
| Comparative Example 2 | (1), 1.3 | (1), 1.0 | 0.912 | 0.910 | 0.002 | 55 | 52 | 3 |
| Comparative Example 3 | (2), 0.9 | (3), 3.1 | 0.939 | 0.878 | 0.061 | 77 | 63 | 14 |
| Comparative Example 4 | (4), 1.5 | (1), 1.5 | 0.948 | 0.910 | 0.038 | 82 | 52 | 30 |

| Example, Comparative Example | Coverage (image analysis) Silica (%) | Strontium titanate (%) | Difference in coverage (% points) | Coverage (calculated value) Silica (%) | Strontium titanate (%) | Abundance ratio of primary particles of external additive (%) |
|---|---|---|---|---|---|---|
| Example 1 | 21 | 19 | 2 | 21.0 | 18.5 | 26 |
| Example 2 | 11 | 30 | 19 | 10.5 | 29.5 | 18 |
| Example 3 | 29 | 11 | 18 | 28.8 | 11.1 | 16 |
| Example 4 | 18 | 20 | 2 | 18.7 | 19.5 | 20 |
| Example 5 | 11 | 28 | 17 | 11.2 | 27.7 | 12 |
| Example 6 | 29 | 12 | 17 | 28.1 | 12.2 | 10 |
| Example 7 | 21 | 19 | 2 | 21.0 | 18.5 | 23 |
| Comparative Example 1 | 8 | 33 | 25 | 7.9 | 32.3 | 8 |
| Comparative Example 2 | 34 | 9 | 25 | 34.0 | 9.2 | 5 |
| Comparative Example 3 | 17 | 24 | 7 | 16.8 | 23.6 | 6 |
| Comparative Example 4 | 27 | 14 | 13 | 26.3 | 13.8 | 2 |

Water Content of Strontium Titanate Particles

Strontium titanate particles not yet being added to the exterior of the toner particles are used as a sample, and the water content of the sample is measured by the measurement method described above. The water content of the strontium titanate particles (1) to (3) is in a range of 2% by mass or more and 5% by mass or less.

Evaluation of Toner and Developer

Conditions of Image Printing by Actual Machine

The developer is mounted on a digital multifunction device (manufactured by FUJIFILM Business Innovation Corp., modified Apeos C7070). The developing potential is adjusted such that the amount of toner applied to the photoreceptor is 5 $g/m^2$, and an image with an image area ratio of 1% is continuously printed on 100,000 sheets of A4 size plain paper at a low temperature and a low humidity (temperature 10° C./relative humidity 20%).

Contamination in Developing Machine (Evaluation on Toner Cloud)

In order to evaluate the toner cloud (toner floating in the multifunction device), after printing is performed on 100,000 sheets of paper as above, the level of contamination of the developing machine is observed and evaluated by being graded A to D based on the following evaluation criteria. The evaluation criteria A and B are acceptable. The results are shown in Table 3.

A: Substantially no contamination is observed.

B: The cover of the developing machine has the color of the toner.

C: The toner is deposited on the developing machine.

D: The toner is leaking from the developing machine.

Charge Distribution of Toner

For evaluating the charge distribution of the toner, by using a charge distribution measuring device (Easpart Analyzer, manufactured by HOSOKAWA MICRON CORPORATION), the amount of the toner having polarity opposite to the polarity of the toner in the developer having been used for printing by the actual machine described above is evaluated based on the following charging evaluation criteria. In this evaluation, A and B are acceptable. The results are shown in Table 3.

A: The amount of the toner having the opposite polarity is less than 5%.

B: The amount of the toner having the opposite polarity is 5% or more and less than 10%.

C: The amount of the toner having the opposite polarity is 10% or more and less than 20%.

D: The amount of the toner having the opposite polarity is 20% or more.

Uneven Distribution of External Additives

Figure 3:
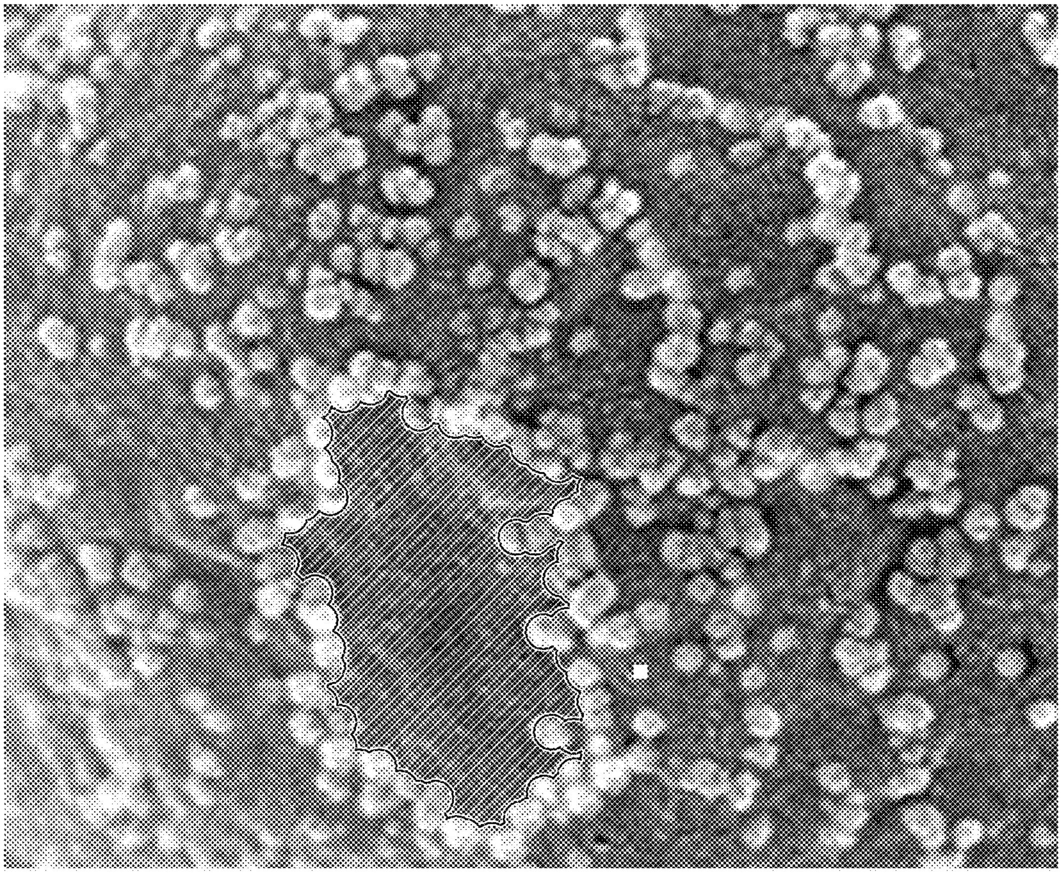
FIG. 3 is a view schematically showing how a region where a toner particle is exposed is selected to determine a degree of uneven distribution of external additives on a toner.

For each of the toners of examples and comparative examples, images of the toner in the developer not yet being used for printing with an actual machine and the toner in the developer having been used for printing with the actual machine are captured at 40,000× magnification by using SEM (manufactured by Hitachi High-Tech Corporation, S-4800). In a 1 μm×1 μm region of each toner particle, the largest region which is surrounded by external additives and in which no external additive is present and the toner particle is exposed is selected, and the area thereof is calculated. (FIG. 3 is a view schematically showing how to select the region where the toner particle is exposed, although the region is not the largest region.)

For 300 sites (1 μm×1 μm) of each of the toner not yet being used for printing with the actual machine and the toner having been used for printing, the average of the maximum areas where the toner particles are exposed is determined, and the area ratio is calculated by the following equation.

Area ratio=maximum area where toner particles having been used for printing are exposed/maximum area where toner base particles not yet being used for printing are exposed The lower the obtained area ratio, the lower the degree of uneven distribution of the external additives. The area ratio is evaluated based on the following criteria. The evaluation criteria A and B are in an acceptable range. The results are shown in Table 3.

A: The ratio of the maximum area where the toner particles having been used for printing are exposed to the maximum area where the toner particles not yet being used for printing are exposed is less than 1.15.

B: The ratio of the maximum area where the toner particles having been used for printing are exposed to the maximum area where the toner particles not yet being used for printing are exposed is 1.15 or more and less than 1.30.

C: The ratio of the maximum area where the toner particles having been used for printing are exposed to the maximum area where the toner particles not yet being used for printing are exposed is 1.30 or more and less than 1.50.

D: The ratio of the maximum area where the toner particles having been used for printing are exposed to the maximum area where the toner particles not yet being used for printing are exposed is 1.50 or more.

Fog

By using the digital multifunction device described above, an image with an image density of 20% is printed on 100,000 sheets of A4 paper, and then an image with an image density of 1% is printed on one sheet of A4 paper. By using an image densitometer X-Rite 938 (manufactured by X-Rite Inc.), the density of fog (fog in the background portion) in the printed images is measured, and the measured density of fog is evaluated based on the following evaluation criteria. For reference, the visually observed image is also described in the parentheses of the criteria. The evaluation criteria A and B are in an acceptable range. The results are shown in Table 3.

A: The density of fog is less than 0.1 (fog is not observed with a loupe).

B: The density of fog is 0.1 or more and less than 0.2 (fog is observed with a loupe but is not seen by visual observation).

C: The density of fog is 0.2 or more and less than 0.3 (fog is partially seen by visual observation).

D: The density of fog is 0.3 or more (fog is visually observed within the entire surface).

Comprehensive Evaluation

Comprehensive evaluation combining the above evaluation results is performed based on the following criteria. The results are shown in Table 3. The evaluation criteria A and B are in an acceptable range.

A: In a case where the evaluation grades A, B, C, and D in each evaluation are replaced with 1, 2, 3, and 4 respectively, and the average of each evaluation is calculated (the same shall be applied to the following criteria), the average of the evaluation is 1.5 or less. (example: in a case where each evaluation includes only A and B, the number of Bs is 2 or less.)

B: The average of each evaluation is more than 1.5 and 2.5 or less.

C: The average of each evaluation is more than 2.5 and 3.5 or less.

D: The average of each evaluation is more than 3.5. (example: in a case where all the evaluations include D or C, the number of Cs is 1 or less)

TABLE 3

| Example, Comparative Example | Contamination of developing machine Evaluation | Charge distribution of toner: Toner having opposite polarity | Charge distribution of toner: Evaluation | Maldistribution of external additive: Area ratio | Maldistribution of external additive: Evaluation | Fog: Concentration | Fog: Evaluation | Comprehensive evaluation |
|---|---|---|---|---|---|---|---|---|
| Example 1 | A | 2% | A | 1.11 | A | 0.03 | A | A |
| Example 2 | B | 7% | B | 1.19 | B | 0.07 | A | B |
| Example 3 | B | 6% | B | 1.18 | B | 0.06 | A | B |
| Example 4 | B | 7% | B | 1.27 | B | 0.13 | B | B |
| Example 5 | C | 9% | B | 1.36 | C | 0.15 | B | B |
| Example 6 | C | 9% | B | 1.33 | C | 0.18 | B | B |
| Example 7 | A | 4% | A | 1.16 | B | 0.05 | A | A |
| Comparative Example 1 | D | 24% | D | 1.55 | D | 0.32 | D | D |
| Comparative Example 2 | D | 28% | D | 1.72 | D | 0.42 | D | D |
| Comparative Example 3 | D | 22% | D | 1.64 | D | 0.31 | D | D |
| Comparative Example 4 | D | 14% | C | 1.52 | D | 0.25 | C | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles;

silica particles that are added to an exterior of the toner particles; and titanic acid compound particles that are added to the exterior of the toner particles and have an average circularity of 0.890 or more and 0.950 or less, wherein the silica particles include particles having a primary particle size of 80 nm or less, the particles having a primary particle size of 80 nm or less have at least one peak in a range of 20 nm or more and less than 80 nm in a number-based primary particle size distribution curve (hereinafter, silica particles having such a peak will be called "specific silica particles"), the titanic acid compound particles have at least one peak in a range of 20 nm or more and less than 80 nm in a number-based primary particle size distribution curve, a difference between an average circularity of the specific silica particles and the average circularity of the titanic acid compound particles is 0.05 or less, a difference between a toner coverage of the specific silica particles and a toner coverage of the titanic acid compound particles is 20% points or less, and a difference between a half width of the peak in the range of 20 nm or more and less than 80 nm in the number-based primary particle size distribution curve of the specific silica particles and a half width of the peak in the range of 20 nm or more and less than 80 nm in the number-based primary particle size distribution curve of the titanic acid compound particles is 20 nm or less.

2. The electrostatic charge image developing toner according to claim 1, wherein the titanic acid compound particles have at least one peak in a range of 30 nm or more and less than 80 nm in the number-based primary particle size distribution curve, and a difference between a particle size of the titanic acid compound particles having a maximum peak in a range of 20 nm or more and less than 80 nm and a particle size of the specific silica particles having a maximum peak in a range of 20 nm or more and less than 80 nm is 20 nm or less.

3. The electrostatic charge image developing toner according to claim 2, wherein the difference between the particle size of the titanic acid compound particles having the maximum peak in a range of 20 nm or more and less than 80 nm and the particle size of the specific silica particles having the maximum peak in a range of 20 nm or more and less than 80 nm is 15 nm or less.

4. The electrostatic charge image developing toner according to claim 1, wherein the difference between the toner coverage of the specific silica particles and the toner coverage of the titanic acid compound particles is 15% points or less.

5. The electrostatic charge image developing toner according to claim 1, wherein the difference between the average circularity of the specific silica particles and the average circularity of the titanic acid compound particles is 0.03 or less.

6. The electrostatic charge image developing toner according to claim 1, wherein the titanic acid compound particles are at least one kind of particles selected from the group consisting of strontium titanate particles, magnesium titanate particles, and calcium titanate particles.

7. The electrostatic charge image developing toner according to claim 6, wherein the titanic acid compound particles are strontium titanate particles.

8. The electrostatic charge image developing toner according to claim 7, wherein the strontium titanate particles are strontium titanate particles doped with lanthanum.

9. The electrostatic charge image developing toner according to claim 7, wherein the strontium titanate particles have a surface having undergone a hydrophobic treatment.

10. The electrostatic charge image developing toner according to claim 1, wherein a proportion of the specific silica particles and the titanic acid compound particles present as primary particles on the toner particles is 10% or more.

11. An electrostatic charge image developer comprising:

the electrostatic charge image developing toner according to claim 1.

12. A toner cartridge comprising:

a container that contains the electrostatic charge image developing toner according to claim 1, wherein the toner cartridge is detachable from an image forming apparatus.

13. A process cartridge comprising:

a developing unit that contains the electrostatic charge image developer according to claim 11 and develops an electrostatic charge image formed on a surface of an image holder as a toner image by using the electrostatic charge image developer, wherein the process cartridge is detachable from an image forming apparatus.

14. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 11 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

15. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 11;

transferring the toner image formed on the surface of the image holder to a surface of a recording medium; and fixing the toner image transferred to the surface of the recording medium.

* * * * *